Oct. 29, 1968  B. L. PEARCE ET AL  3,407,674
DRIVE CHAIN TENSIONING APPARATUS
Filed July 8, 1966  3 Sheets-Sheet 1
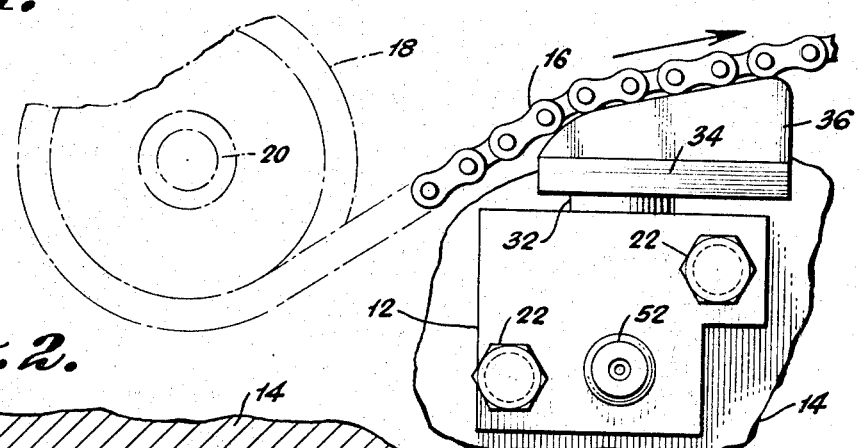
Fig. 1.
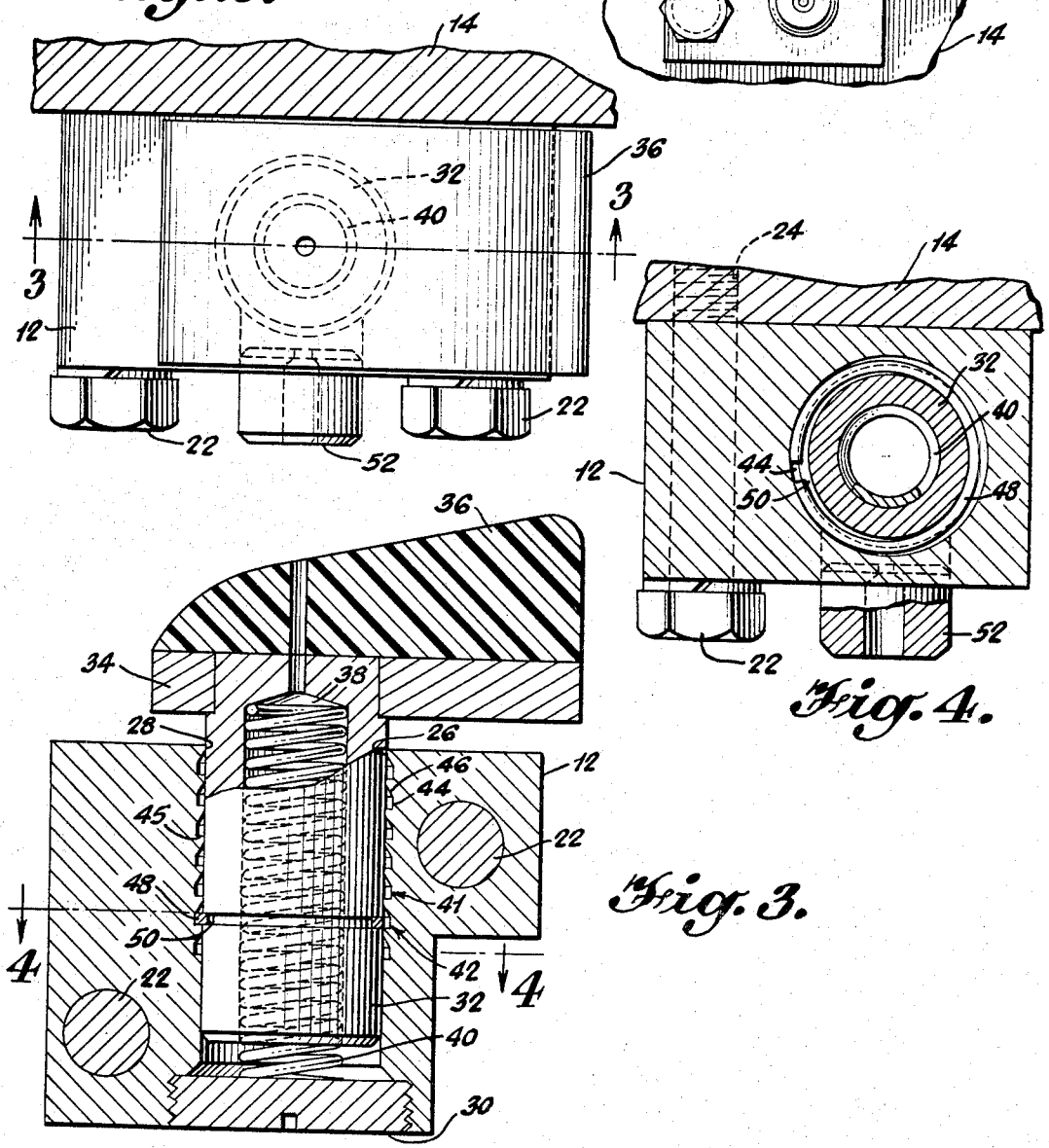
Fig. 2.
Fig. 3.
Fig. 4.

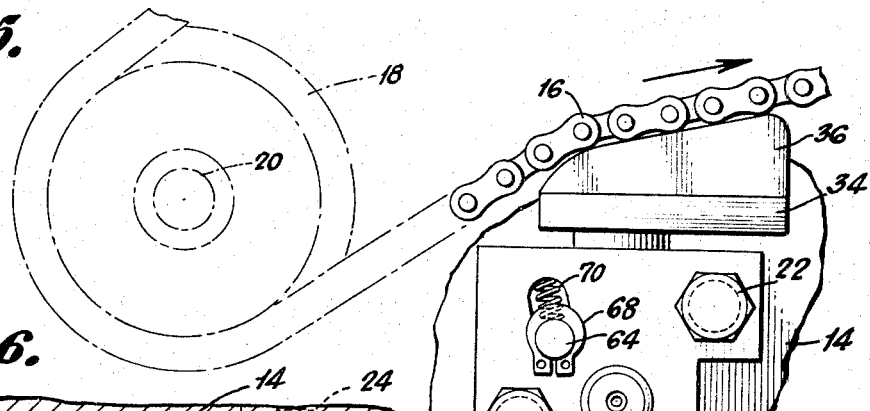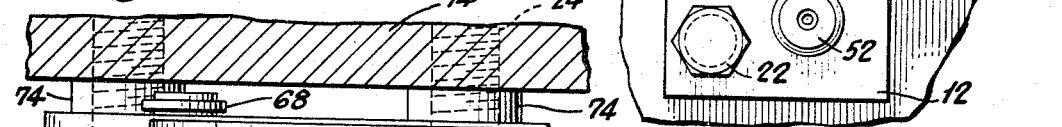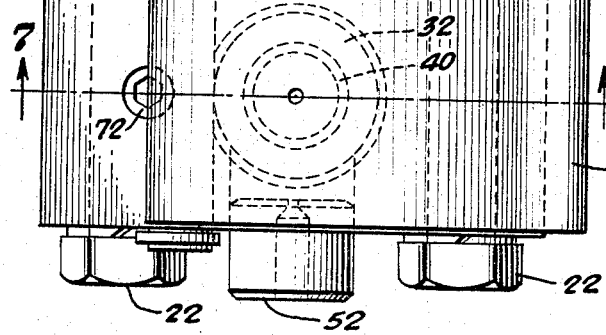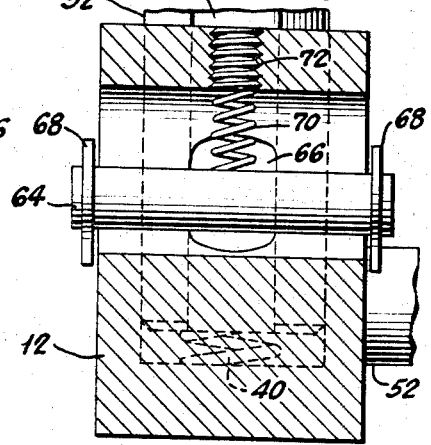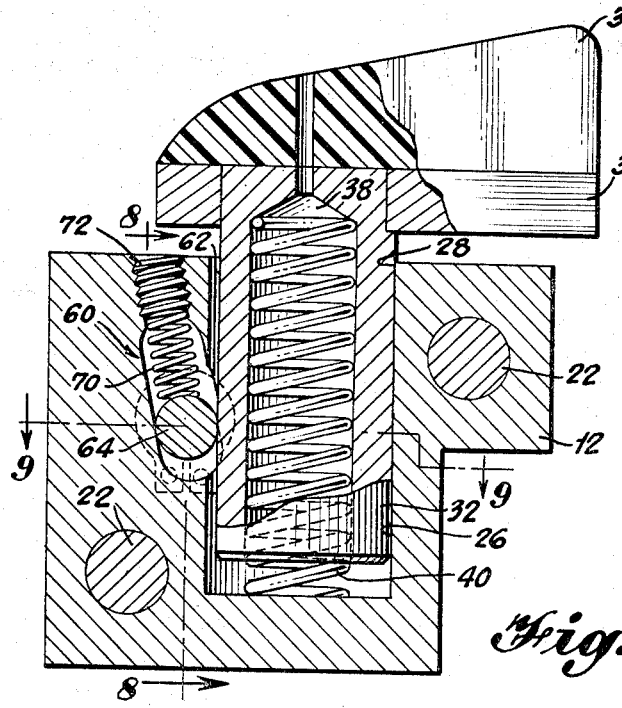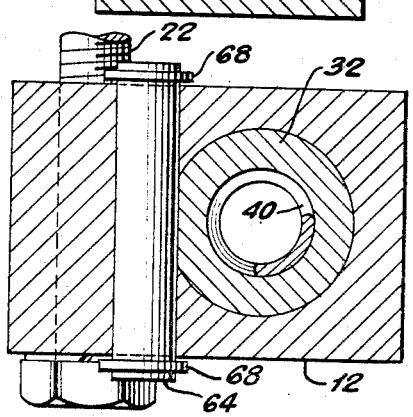

Oct. 29, 1968  B. L. PEARCE ET AL  3,407,674
DRIVE CHAIN TENSIONING APPARATUS
Filed July 8, 1966
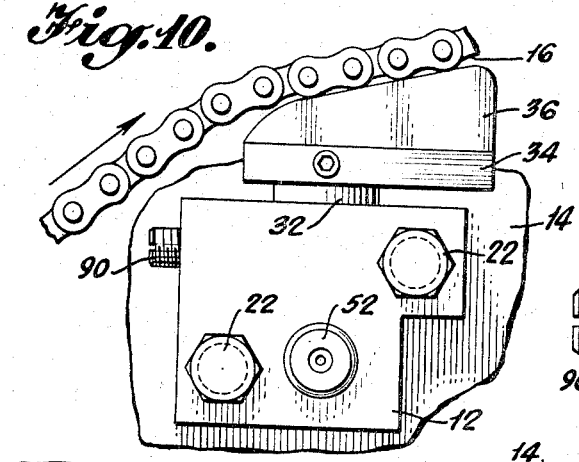
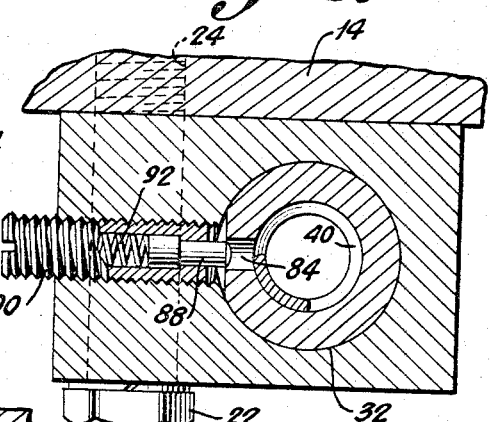
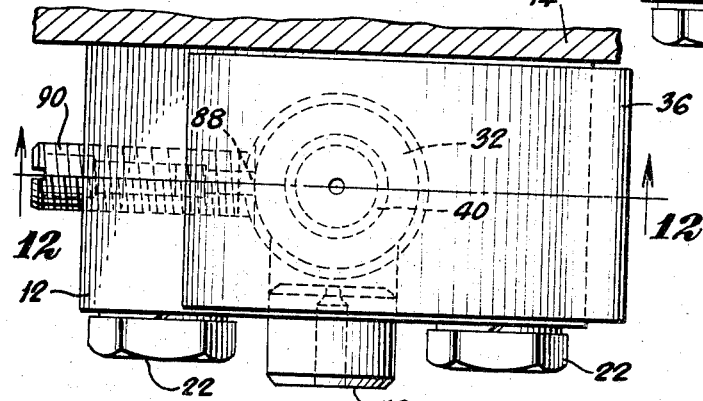
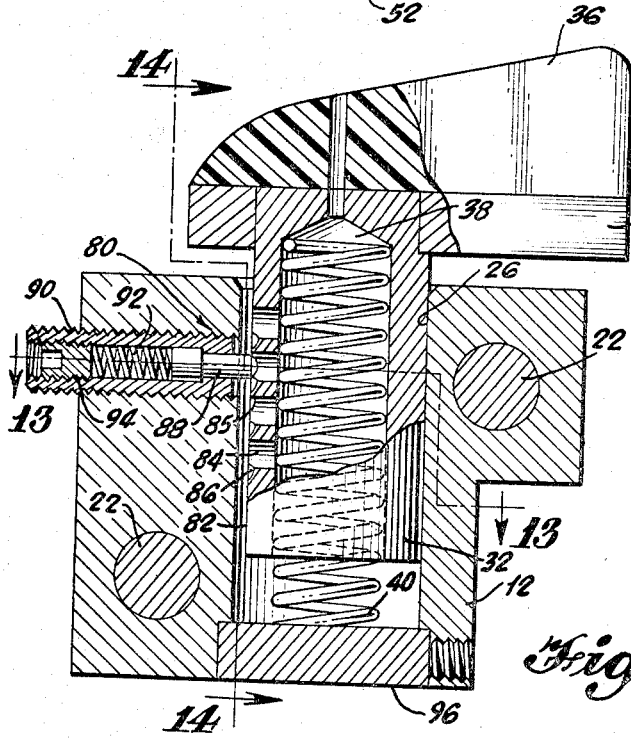
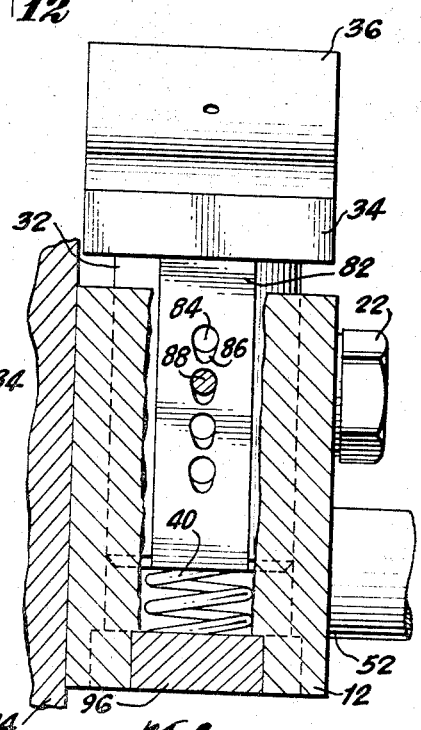

3,407,674
DRIVE CHAIN TENSIONING APPARATUS
Bert L. Pearce and Clarence E. Kelch, Indianapolis, Ind., assignors to FMC Corporation, a corporation of Delaware
Filed July 8, 1966, Ser. No. 563,896
2 Claims. (Cl. 74—242.11)

ABSTRACT OF THE DISCLOSURE

A drive chain tensioning device comprising; a housing having a bore therein, a piston slidably received within said bore with one end thereof extending outwardly of said bore, a resilient pad affixed to the said one end of the piston for tensioning engagement with an endless chain, means for urging the piston outwardly of said bore to press the pad into engagement with the endless chain, and unidirectional locking means for preventing the piston from sliding back into the bore.

---

The present invention relates to a chain tensioning apparatus which automatically applies proper operating tension to an endless driving chain, such as, for example, the timing chain utilized in an automotive internal combustion engine. Specifically, the invention concerns a chain tensioning apparatus which engages the slack run of an automotive engine timing chain for tightening the chain and automatically imparting efficient operating tension conditions thereto in a manner which obviates objectionable chain rattling noises and which substantially reduces chain wear.

Generally, in the construction of automotive internal combustion engines, the crankshaft is drivingly connected to the camshaft by appropriate sprockets and an endless timing chain. During normal engine operation the timing chain is subjected to operating conditions, such as wide variations of imposed loads and driving speeds, which tend to accelerate chain wear. Consequently, due to the wear encountered incident to normal engine operation, automotive timing chains tend to become elongated, resulting in execessive chain slack. The presence of excessive chain slack often results in objectionable rattling noises and further acceleration of chain wear. Therefore, chain tensioners have been developed for obviating the disadvantages stemming from operation of automotive timing chains with an excessive amount of slack.

The chain tensioners employed heretofore have usually included a biased metal sprocket or roller which engages the slack run of the timing chain. These devices, while effective for applying some degree of controlled tension to the chain, may promote chain wear in a manner similar to that caused by an idler, due to the engagement of the chain with the additional element, namely the sprocket or roller. Other automotive chain tensioning devices are known in the art which include a chain-engaging element composed of a resilient material such as rubber. While devices of this nature generally do not accelerate chain wear, they are for the most part of a rather insubstantial construction, necessitating frequent repair and replacement.

In distinction to the chain tensioners presently known in the art, the apparatus of the present invention comprises a compact and rugged device which automatically maintains the proper operating tension in an automotive timing chain without subjecting the chain to additional wear. The chain-engaging member of the present invention is composed of a long-wearing, resilient material such as neoprene, which, while having an extended useful operational life, will itself absorb the wear that would be imposed on the chain incident to the use of a metal chain-engaging element, instead of subjecting the more expensive timing chain to an accelerated rate of wear. Under normal operating conditions, a timing chain tensioned by the apparatus of the present invention should not require replacement during the practical operating life of the engine. Furthermore, the apparatus is if relatively simple construction incorporating few moving parts, and this factor, coupled with its inherent ruggedness ensures a long operating life free of malfunctions or breakdowns. The device also is extremely simple to install and will operate for extended periods of time with a minimum of attention and maintenance.

Briefly described, the chain tensioning apparatus of the present invention comprises a housing adapted to be secured to the cylinder block of an internal combustion engine or other appropriate mounting adjacent the path of travel of the slack run of an endless driving chain. The housing has an internal cylindrical bore which opens from one side of the housing. A piston is slidably received within the bore, one end of which extends from the bore opening in the housing. A resilient pad is affixed to the end of the piston extending from the housing, and is placed into tensioning engagement with the slack run of the timing chain. The piston has an internal chamber which opens from the end of the piston received within the housing bore. A compression spring is positioned within the piston chamber and extends from the open end of the piston into the bore. One end of the compression spring abuts a wall of the chamber and the other end abuts the housing to urge the piston outwardly of the bore, and thus urge the resilient pad affixed to the piston into engagement with the endless driving chain for tensioning the chain. In addition, a unidirectional locking means within the housing engages the piston to prevent it from sliding back into the bore thus providing the piston with a non-return feature for limiting movement of the piston and resilient pad affixed thereto. The non-return feature of the apparatus ensures that proper tension will be maintained in the timing chain even though the chain and chain tensioning apparatus are subjected to severe shocks and jolts incident chain driving action.

From the foregoing, it will be apparent that a primary object of the present invention is to provide a chain tensioning apparatus which is of a compact, rugged and relatively simple construction, requiring a minimum of maintenance for extended periods of operation.

It is another object of the invention to provide a chain tensioning apparatus which automatically maintains an efficient operating tension in an automotive timing chain for obviating objectionable chain rattling noises and which substantially reduces chain wear.

Yet another object of the invention is to provide a chain tensioning apparatus which will maintain the proper tension in an automotive timing chain while the chain and chain tensioning apparatus are subjected to severe shocks and jolts.

The above and more specific objects of the present invention will be apparent from the following specific description of several preferred embodiments thereof, given in conjunction with the following drawings in which:

FIG. 1 is an elevational view of one embodiment of a chain tensioning apparatus of the invention shown in its operating environment secured to the cylinder block of an automotive internal combustion engine;

FIG. 2 is a plan view of the chain tensioning apparatus shown in FIG. 1;

FIG. 3 is a sectional view taken on line 3—3 of FIG. 2;

FIG. 4 is a sectional view taken on line 4—4 of FIG. 3;

FIG. 5 is an elevational view similar to FIG. 1, showing a second embodiment of a chain tensioning apparatus of the invention;

FIG. 6 is a plan view of the chain tensioning apparatus shown in FIG. 5;

FIG. 7 is a sectional view taken on line 7—7 of FIG. 6;

FIG. 8 is a sectional view taken on line 8—8 of FIG. 7;

FIG. 9 is a sectional view taken on line 9—9 of FIG. 7;

FIG. 10 is an elevational view similar to FIG. 1, showing a third embodiment of a chain tensioning apparatus of the invention;

FIG. 11 is a plan view of the chain tensioning apparatus shown in FIG. 10;

FIG. 12 is a sectional view taken on line 12—12 of FIG. 11;

FIG. 13 is a sectional view taken on line 13—13 of FIG. 12; and

FIG. 14 is a sectional view taken on line 14—14 of FIG. 12.

Referring to the drawings, there is shown therein three preferred embodiments of the chain tensioning apparatus of the present invention. The first embodiment, shown in FIGS. 1–4, comprises a housing 12 which is affixed to the cylinder block 14 of an automotive internal combustion engine by a pair of threaded bolts 22. Bolts 22 engage the threads of tapped holes 24 formed in engine block 14. Housing 12 is positioned adjacent the path of travel of the slack run of an endless timing chain 16 which engages a sprocket 18 mounted on the end of the engine crankshaft 20. Chain 16 drivingly connects crankshaft 20 to the engine camshaft (not shown) for rotating the camshaft in timed relation to the rotation of crankshaft 20.

A cylindrical bore 26 is formed in housing 12, opening from the upper side thereof through a circular opening 28. Bore 26 is closed at the lower end of housing 12 by a threaded plug 30, which may be removed as required for a purpose to be subsequently described.

The lower portion of a piston 32 is slidably received within bore 26 through bore opening 28 for movement along the bore with respect to housing 12. The upper end of piston 32 extends through opening 28 terminating above the upper side of housing 12 and has affixed to the end thereof a rectangular backing plate 34. A resilient pad 36 is secured to the upper surface of plate 34 for engagement with the slack run of endless timing chain 16. Resilient pad 36 may be composed of neoprene or a similar long-wearing resilient material, and is affixed to plate 34 by a suitable adhesive.

Piston 32 has a chamber 38 formed therein which opens through the lower end of the piston into housing bore 26. A compression spring 40 is positioned within chamber 38 and extends through the chamber opening in the lower end of piston 32. One end of compression spring 40 abuts the upper wall of chamber 38 and the other end of spring 40 abuts housing plug 30.

Compression spring 40 urges piston 32 upwardly out of housing bore 26 and thus urges resilient pad 36, affixed to the upper end of the piston, into tensioning engagement with the slack run of chain 16. It will be seen from the foregoing description that the frictional tensioning force exerted by resilient pad 36 against chain 16 is directly dependent upon the expansion force of compression spring 40. The spring constant value of compression spring 40 is therefore suitably chosen to provide the proper operating tension in chain 16. As the timing chain wears in normal operation, and becomes elongated or slack, compression spring 40 will urge piston 32 slidably further out of housing bore 26, and maintain tension-applying contact between resilient pad 36 and chain 16. By maintaining the proper operating tension in chain 16, resilient pad 36 will obviate any chain rattling noises which might result as a consequence of excessive chain slack.

Resilient pad 36 not only will maintain an efficient operating tension in chain 16, but due to the nature of the resilient material from which it is composed, will itself absorb the wear that would be imposed on the chain incident to the use of a conventional chain tensioner having a metal chain-engaging member such as a metal sprocket or roller. Being composed of a long-wearing resilient material, resilient pad 36 will require but infrequent replacement. However, it is obvious that replacement of resilient pad 36 is to be preferred over replacement of the more expensive timing chain 16. Under normal operating conditions, a timing chain tensioned by the apparatus of the invention would be expected to operate satisfactorily for the practical life of the internal combustion engine in which it is mounted.

A unidirectional locking means 42 is provided to prevent piston 32 from sliding back into bore 26 thus providing the aparatus with a non-return feature for controlling movement of the piston. This feature of the apparatus precludes the possibility that resilient pad 36 will be moved out of frictional contact with timing chain 16 when the automobile in which the chain and apparatus are mounted encounters shocks and jolts incident to normal driving action performed by the chain.

The unidirectional locking means includes a plurality of annular recesses 41 spaced apart along bore 26. Each recess 41 includes a cylindrical shaped portion 44 terminating in a shoulder 45 at one end and an adjacent conically shaped portion 46 at the opposite end of the recess. The conically shaped portions 46 of recesses 41 are positioned nearer the upper side of housing 12 and bore opening 28 than the adjacent cylindrically shaped portions 44.

Unidirectional locking means 42 also includes a retaining member which engages piston 32 and precludes movement of the piston back into housing bore 26. The retaining member comprises an expandable split ring 48 which engages a groove 50 in the surface of piston 32. The outer margin of ring 48 also is receivable successively within annular recesses 41.

As compression spring 40 urges piston 32 outwardly of housing bore 26, the conically shaped portions 46 of recesses 41 cammingly contract split ring 48 into groove 50, permitting the piston to move upwardly out of the bore under the influence of the compression spring.

As piston 32 slides upwardly along bore 26, split ring 48 expands successively into cylindrically shaped recess portions 44. When the ring 48 is seated in a cylindrically shaped recess portion 44, continued upward movement of piston 32 will cause the ring to be cammingly contracted by the adjacent conically shaped recess portion 46 into groove 50. However, a downwardly directed force on piston 32 will cause the lower side of ring 48 to abut the lower edge of the cylindrically shaped recess portion 44 which will retain piston 32 against movement back into housing bore 26. The piston is thus prevented from moving back into bore 26 in the event that the piston is subjected to a shock or jolt exerting a downward force thereon. In this manner, resilient pad 36 affixed to the upper end of piston 32, will be maintained in tensioning contact with timing chain 16 at all times.

The apparatus also includes a lubrication fitting 52 having an aperture therethrough, which permits periodic lubrication of the elements of the apparatus located within housing bore 26.

When it becomes necessary to replace resilient pad 36, as will be required occasionally, housing plug 30 is first unscrewed and withdrawn from housing 12, thus releasing the spring pressure on piston 32 and permitting the removal of compression spring 40. Housing 12 next is removed from cylinder block 14 by unscrewing and withdrawing bolts 22. Piston 32 may then be slidably withdrawn from housing bore 26 from the upper side of housing 12. The assembly comprising plate 34 and pad 36 is then disassembled from the end of piston 32.

To reassemble the apparatus, piston 32 and split ring 48 are inserted into housing bore 26 from the lower side of housing 12 and pushed through the bore just far enough to extend the upper end of piston 32 through bore opening 28. A replacement assembly comprising plate 34 and pad 36 is then affixed to the upper end of the piston, and housing 12 rebolted to cylinder block 14. Compression spring 40 is then reinserted into piston chamber 38 and housing plug 30 repositioned in housing 12. As housing plug 30 is screwed into the lower side of housing 12, compression spring 40 will urge piston 32 upwardly and position the new resilient pad 36 into tensioning contact with timing chain 16.

A second embodiment of the invention is shown in FIGS. 5–9, wherein like reference numerals have been used for identifying elements previously described. The primary difference between the chain tensioning apparatus embodiment shown in FIGS. 5–9, and that previously described in conjunction with FIGS. 1–4, resides in the different unidirectional locking means used in the two embodiments.

Unidirectional locking means 60 utilized in the apparatus shown in FIGS. 5–9 includes an axial flattened portion 62 formed on the surface of piston 32. Flattened piston surface portion 62 is engaged by a retaining member which comprises a locking pin 64. Locking pin 64 is received within a transverse opening through housing 12 which is large enough to permit the locking pin to move generally vertically therein, and which communicates with bore 26 through an opening 66 in the surface of the bore. The periphery of locking pin 64 extends through opening 66 for engaging flattened piston surface portion 62. Locking pin 64 is retained within the transverse opening in housing 12 by spring clamps 68 affixed to the ends thereof.

A biasing spring 70 abuts locking pin 64 and urges the pin downwardly toward the lower end of piston 32 and against flattened piston surface portion 62. Biasing spring 70 is positioned within a generally vertical chamber in housing 12 and retained therein by an Allen-head screw 72. Screw 72 may be adjusted for regulating the compression force exerted by spring 70 against locking pin 64.

As will be evident from the foregoing description, locking pin 64 will be cammingly depressed against the force of biasing spring 70 as piston 32 is urged out of housing bore 26 by compression spring 40, permitting the piston to slide upwardly out of the bore. However, when a downwardly directed force is exerted on piston 32 urging the piston back into bore 26, locking pin 64 will wedge against flattened surface portion 62 and the opposite wall of the traverse opening in housing 12 which receives pin 64, thereby locking the piston against the surface of bore 26 to prevent the piston from moving back into the bore. To allow for the slight movement of locking pin 64 incident to its coaction with flattened piston surface portion 62, spacers 74 are interposed between housing 12 and cylinder block 14 to space the inside edge of housing 12 away from the surface of cylinder block 14.

In the embodiment of the invention shown in FIGS. 5–9, the requirement for a removable housing plug in housing 12 is eliminated. Piston 32 can be inserted into housing bore 26 through opening 28 from the upper side of housing 12 as locking pin 64 is held away from flattened piston surface portion 62. A replacement assembly comprising plate 34 and pad 36 may thus be installed as required by withdrawing piston 32 from bore 26 and reinserting the piston back into the bore, both from the upper side of housing 12.

A third embodiment of the invention is shown in FIGS. 10–14. The primary difference between this embodiment and those previously described also resides in the different unidirectional locking means utilized with each embodiment. Again, like reference numerals have been used for identifying elements of the apparatus which have been previously described.

Unidirectional locking means 80 associated with the embodiment shown in FIGS. 10–14 includes an axial flattened portion 82 formed on the surface of piston 32. A plurality of recesses made up by axially spaced radial holes 84 are provided in piston 32 which extend between piston chamber 38 and flattened piston surface portion 82. Each radial hole 84 terminates at flattened surface portion 82 providing a shoulder 85 at one end and a communicating sloped depression 86 at the other end on surface portion 82. Depressions 86 slope outwardly from holes 84 and downwardly toward the lower end of piston 32.

A retaining member comprising a spring biased plunger 88 is positioned within a threaded sleeve 90 which itself is received within a transverse threaded recess in housing 12. The recess which receives sleeve 90 extends into the housing from one side thereof and opens into housing bore 26.

Plunger 88 extends through a reduced diameter opening in the interior end of sleeve 90 and protrudes into housing bore 26 for successive registration with radial holes 84. A compression spring 92 is positioned within sleeve 90 and abuts plunger 88 for urging the plunger inwardly toward housing bore 26 so that the plunger will be successively received within holes 84. A threaded Allen screw 94 is screwed into the exterior end of sleeve 90 for retaining spring 92 therein.

As piston 32 is urged upwardly out of housing bore 26 by compression spring 40, plunger 88 is cammingly depressed by sloped depressions 86 thus permitting piston 32 to slide upwardly out of the bore. However, the successive registration of plunger 88 with holes 84 will prevent piston 32 from moving back into the bore in the event the piston is subjected to an applied downwardly directed force.

Housing 12 of the apparatus shown in FIGS. 10–14 also includes a removable housing plug 96 which is removed for the replacement of resilient pad 36 as required. The procedure to be followed in replacing the pad is similar to that previously described in conjunction with the description of the embodiment shown in FIGS. 1–4.

From the foregoing it will be appreciated that the embodiments of the invention described hereinabove are extremely rugged and compact devices which are easy to install and which will maintain an efficient operating tension in an endless timing chain under the most severe operating conditions.

It is to be understood that the chain tensioning apparatus of the invention is not to be limited to the exact construction of the preferred embodiments shown and described hereinabove, but that various changes and modifications may be made therefrom without departing from the spirit and scope of the invention as defined in the appended claims.

What is claimed is:

1. A drive chain tensioning device comprising:
 a housing adapted to be secured adjacent the path of travel of an endless chain, said housing having a bore therein opening from one side of said housing;
 a piston slidably received within said bore with one end extending outwardly of said bore;
 a resilient pad affixed to the said one end of the piston for tensioning engagement with said endless chain;
 a compression spring disposed within said bore between said piston and said housing to urge the piston outwardly of the bore and press said pad into engagement with the endless chain for tensioning the chain; and
 unidirectional locking means associated with said bore and said piston for preventing the piston from sliding back into the bore, said unidirectional locking means comprising, an annular groove in the surface of said piston, a plurality of recesses in said housing spaced apart along said bore, each said recess having a shoulder at one end and an outwardly sloping portion at the other end, said outwardly sloping portion of each said recess being located nearer the said one side of the housing and the opening of said bore therefrom than said shoulder, and a retaining member comprising an expansible ring engaging said groove and receivable successively within each of said recesses whereby upon sliding movement of the piston out of the bore said ring is cammingly contracted into the groove successively by the outwardly sloping recess portions, permitting the piston to move out of the bore under the influence of said compression spring, and the ring expands successively into said recesses and engages said recess shoulders to prevent the piston from moving back into the bore.

2. A drive chain tensioning device comprising:

a housing adapted to be secured adjacent the path of travel of an endless chain, said housing having a bore therein opening from one side of said housing;

a piston slidably received within said bore with one end extending outwardly of said bore;

a resilient pad affixed to the said one end of the piston for tensioning engagement with said endless chain;

a compression spring disposed within said bore between said piston and said housing to urge the piston outwardly of the bore and press said pad into engagement with the endless chain for tensioning the chain; and unidirectional locking means associated with said bore and said piston for preventing the piston from sliding back into the bore, said unidirectional locking means comprising, an annular groove in the surface of said piston, a plurality of annular recesses in said housing spaced apart along said bore, each said recess having a cylindrically shaped portion ending in a shoulder and an adjacent conically shaped portion at the other end of the recess, said conically shaped portion of each said recess being located nearer the said one side of the housing and the opening of said bore therefrom than said cylindrically shaped portion, and a retaining member comprising an expansible ring engaging said groove and receivable successively within each of said recesses whereby upon sliding movement of the piston out of the bore said ring is cammingly contracted into the groove successively by the conical recess portions, permitting the piston to move out of the bore under the influence of said compression spring, and the ring expands successively into the cylindrical recess portions to prevent the piston from moving back into the bore.

References Cited

UNITED STATES PATENTS

| 2,963,918 | 12/1960 | Blakstad | 74—242.8 |
| 3,232,129 | 2/1966 | Hopkins | 74—242.11 |
| 3,252,347 | 5/1966 | Seaman | 74—242.8 |
| 1,673,762 | 6/1928 | Chapman | 74—242.11 |
| 3,007,344 | 11/1961 | Schaefer | 74—242.14 |

FOREIGN PATENTS

| 696,586 | 9/1953 | Great Britain. |
| 831,390 | 3/1960 | Great Britain. |
| 1,013,876 | 12/1965 | Great Britain. |
| 958,070 | 2/1957 | Germany. |

FRED C. MATTERN, Jr., *Primary Examiner.*

J. A. WONG, *Assistant Examiner.*